(12) United States Patent
Hampson et al.

(10) Patent No.: US 10,934,965 B2
(45) Date of Patent: Mar. 2, 2021

(54) AUTO-IGNITION CONTROL IN A COMBUSTION ENGINE

(71) Applicant: Woodward, Inc., Fort Collins, CO (US)

(72) Inventors: Gregory James Hampson, Boulder, CO (US); Samuel James McCreery, Loveland, CO (US); Jeffrey Carlson, Denver, CO (US); Suraj Nair, Fort Collins, CO (US); Domenico Chiera, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 16/376,909

(22) Filed: Apr. 5, 2019

(65) Prior Publication Data
US 2020/0318570 A1 Oct. 8, 2020

(51) Int. Cl.
*B60T 7/12* (2006.01)
*F02D 41/30* (2006.01)
(Continued)

(52) U.S. Cl.
CPC ..... *F02D 41/3041* (2013.01); *F02D 41/2412* (2013.01); *F02P 5/045* (2013.01)

(58) Field of Classification Search
CPC ... B60W 2510/0619; B60W 2710/0622; F02B 19/1052; F02B 19/1085; F02D 3/04;
(Continued)

(56) References Cited

U.S. PATENT DOCUMENTS

| 4,417,556 A | 11/1983 | Latsch |
| 4,494,509 A | 1/1985 | Long |

(Continued)

FOREIGN PATENT DOCUMENTS

| EP | 0221673 A2 | 5/1987 |
| EP | 1164277 | 12/2001 |

(Continued)

OTHER PUBLICATIONS

AVAT Automation GMBH, "E²Precon, the Cylinder Pressure Based Engine Controller Combines Efficiency with Performance," published on or before Oct. 2013, 2 pages. http://www.avat.de/en/engine-control-systems-esc/products/e2precon.html.

(Continued)

*Primary Examiner* — John Kwon
(74) *Attorney, Agent, or Firm* — Fish & Richardson P.C.

(57) ABSTRACT

A method of controlling combustion in an internal combustion engine includes measuring parameters of combustion in a cylinder of the engine during a combustion phase of the cylinder, after igniting an air/fuel charge in the cylinder, and calculating the heat release of combustion in the cylinder based on the measured parameters. An auto-ignition event of the air/fuel charge is identified based on the calculated heat release, and, based at least in part on the identified auto-ignition event, at least one of ignition timing in the cylinder for the next combustion phase of the cylinder or an amount of exhaust gas supplied to the cylinder for the next combustion phase of the cylinder is controlled to cause an auto-ignition event of the air/fuel charge in the next combustion phase to shift toward a specified crank angle.

30 Claims, 7 Drawing Sheets

(51) Int. Cl.
  *F02D 41/24* (2006.01)
  *F02P 5/04* (2006.01)
(58) Field of Classification Search
  CPC .. F02D 33/00; F02D 41/0002; F02D 41/0025; F02D 41/0052; F02D 41/0042; F02D 2700/02
  USPC .......... 701/103–105, 114, 115; 123/434, 435
  See application file for complete search history.

(56) References Cited

U.S. PATENT DOCUMENTS

| | | |
|---|---|---|
| 4,565,087 A | 1/1986 | Damson et al. |
| 4,716,874 A | 1/1988 | Hilliard et al. |
| 4,736,724 A | 4/1988 | Hamburg et al. |
| 4,944,271 A | 7/1990 | Iwata et al. |
| 5,156,126 A | 10/1992 | Ohkubo et al. |
| 5,197,448 A | 3/1993 | Porreca et al. |
| 5,425,339 A | 6/1995 | Fukui |
| 5,442,954 A | 8/1995 | Fukui |
| 5,676,113 A | 10/1997 | Johansson et al. |
| 5,715,794 A | 2/1998 | Nakamura |
| 5,758,307 A | 5/1998 | Haefner |
| 5,765,530 A | 6/1998 | Machida |
| 5,765,532 A | 6/1998 | Loye |
| 5,777,216 A | 7/1998 | Van Duyne et al. |
| 5,803,047 A | 9/1998 | Rask |
| 5,828,217 A | 10/1998 | Inagaki et al. |
| 5,831,263 A | 11/1998 | Komachiya |
| 5,878,717 A | 3/1999 | Zur Loye |
| 5,896,842 A | 4/1999 | Abusamra |
| 5,959,192 A | 9/1999 | Mogi et al. |
| 5,992,386 A | 11/1999 | Nytomt et al. |
| 6,029,627 A | 2/2000 | VanDyne |
| 6,142,119 A | 11/2000 | Abe |
| 6,222,367 B1 | 4/2001 | Shimizu et al. |
| 6,230,683 B1 | 5/2001 | Zur Loye et al. |
| 67,042,499 | 6/2001 | Viele et al. |
| 6,273,076 B1 | 8/2001 | Beck |
| 6,321,733 B1 | 11/2001 | Suckewer et al. |
| 6,354,268 B1 | 3/2002 | Beck et al. |
| 6,463,907 B1 | 10/2002 | Hiltner |
| 6,474,323 B1 | 11/2002 | Beck |
| 6,484,694 B2 | 11/2002 | Thomas |
| 6,553,305 B2 | 4/2003 | Dixon et al. |
| 6,560,526 B1 | 5/2003 | Matekunas |
| 6,561,157 B2 | 5/2003 | Zur Loye |
| 6,598,468 B2 | 7/2003 | Zur Loye |
| 6,684,849 B2 | 2/2004 | Zur Loye |
| 6,711,945 B2 | 3/2004 | Fuerhapter |
| 6,779,517 B2 | 8/2004 | Sakakura |
| 6,786,200 B2 | 9/2004 | Viele et al. |
| 6,810,320 B2 | 10/2004 | Yamamoto et al. |
| 6,840,218 B2 | 1/2005 | Scholl |
| 6,874,464 B2 | 4/2005 | Montgomery |
| 6,907,870 B2 | 6/2005 | zur Loye et al. |
| 6,915,776 B2 | 7/2005 | Zur Loye |
| 6,931,914 B2 | 8/2005 | Dohi et al. |
| 6,935,310 B2 | 8/2005 | Viele et al. |
| 6,994,073 B2 | 2/2006 | Tozzi et al. |
| 7,062,955 B2 | 6/2006 | Kashiwase |
| 7,150,262 B2 | 12/2006 | Demura |
| 7,155,334 B1 | 12/2006 | Stewart |
| 7,174,251 B2 | 2/2007 | Iwamoto et al. |
| 7,231,905 B1 | 6/2007 | Haskara et al. |
| 7,231,906 B1 | 6/2007 | Haskara |
| 7,246,597 B2 | 7/2007 | Kuo |
| 7,299,680 B2 | 11/2007 | Okubo |
| 7,367,318 B2 | 5/2008 | Moriya |
| 7,467,614 B2 | 12/2008 | Stewart et al. |
| 7,506,535 B2 | 3/2009 | Kang |
| 7,506,536 B2 | 3/2009 | Cornwell |
| 7,509,932 B2 | 3/2009 | Hara |
| 7,549,414 B2 | 6/2009 | Moriya |
| 7,606,650 B2 | 10/2009 | Mizuno |
| 7,606,655 B2 | 10/2009 | Husted et al. |
| 7,669,583 B2 | 3/2010 | Moriya |
| 7,673,618 B2 | 3/2010 | Hasegawa |
| 7,693,646 B2 | 4/2010 | Moriya |
| 7,735,478 B1 | 6/2010 | Dagci |
| 7,798,124 B2 | 9/2010 | Barrett et al. |
| 7,798,125 B2 | 9/2010 | Barrett et al. |
| 7,806,100 B2 | 10/2010 | Schnorbus |
| 7,822,529 B2 | 10/2010 | Dagci et al. |
| 7,861,690 B2 | 1/2011 | Moriya |
| 7,870,844 B2 | 1/2011 | Moriya |
| 7,899,601 B2 | 3/2011 | Yun |
| 7,921,699 B2 | 4/2011 | Hoshi |
| 7,930,929 B2 | 4/2011 | Galtier |
| 7,957,889 B2 | 6/2011 | Portin |
| 8,046,156 B2 | 10/2011 | Moriya |
| 8,051,836 B2 | 11/2011 | Moriya |
| 8,068,972 B2 | 11/2011 | Auclair |
| 8,150,602 B2 | 4/2012 | Anilkumar |
| 8,161,944 B2 | 4/2012 | Moriya |
| 8,229,648 B2 | 7/2012 | Kang |
| 8,260,531 B2 | 9/2012 | Yasuda |
| 8,301,356 B2 | 10/2012 | Wang |
| 8,408,191 B2 | 4/2013 | Sellnau |
| 8,413,495 B2 | 4/2013 | Higuchi |
| 8,596,242 B2 | 12/2013 | Nada |
| 8,600,644 B2 | 12/2013 | Verner |
| 8,645,044 B2 | 2/2014 | Wermuth |
| 8,651,088 B2 | 2/2014 | Urano |
| 8,677,975 B2 | 3/2014 | Auclair |
| 8,744,733 B2 | 6/2014 | Sano |
| 8,826,884 B2 | 9/2014 | Kang et al. |
| 8,831,856 B2 | 9/2014 | Yasuda |
| 8,843,295 B2 | 9/2014 | Santoso |
| 8,910,615 B2 | 12/2014 | Suzuki |
| 9,010,303 B2 | 4/2015 | Moonjelly |
| 9,228,506 B2 | 1/2016 | Gokhale et al. |
| 9,316,169 B2 | 4/2016 | Barth |
| 9,371,789 B2 | 6/2016 | Rosswurm |
| 9,638,129 B2 | 5/2017 | Nishio |
| 9,890,690 B2 | 2/2018 | Domenico et al. |
| 10,012,155 B2 | 7/2018 | Barta et al. |
| 2002/0007816 A1 | 1/2002 | Zur Loye |
| 2003/0200955 A1 | 10/2003 | Zur Loye et al. |
| 2004/0267430 A1 | 12/2004 | Ancimer |
| 2005/0229903 A1 | 10/2005 | Kobayashi |
| 2006/0185631 A1 | 8/2006 | Fitzgerald |
| 2007/0069617 A1 | 3/2007 | Tozzi et al. |
| 2007/0119417 A1 | 5/2007 | Eng |
| 2008/0078359 A1 | 4/2008 | Barrett et al. |
| 2008/0082250 A1 | 4/2008 | Husted |
| 2008/0133108 A1 | 6/2008 | Kojima et al. |
| 2009/0078234 A1 | 3/2009 | Barrett et al. |
| 2009/0259383 A1* | 10/2009 | Wang ................. F02D 35/023 701/102 |
| 2009/0281708 A1 | 11/2009 | Loeffler et al. |
| 2010/0065016 A1 | 3/2010 | Bromberg |
| 2010/0186390 A1* | 7/2010 | Perry ................. F01N 3/2073 60/295 |
| 2010/0186391 A1* | 7/2010 | Najt ................. B01D 53/8696 60/295 |
| 2010/0305829 A1 | 12/2010 | Santoso |
| 2011/0010074 A1 | 1/2011 | Hung et al. |
| 2011/0040475 A1 | 2/2011 | Taibi et al. |
| 2011/0146637 A1 | 6/2011 | Kang et al. |
| 2012/0016567 A1 | 1/2012 | Delpech |
| 2012/0103304 A1 | 5/2012 | Kang et al. |
| 2013/0042843 A1 | 2/2013 | Sano |
| 2013/0103283 A1 | 4/2013 | Malaczynski |
| 2013/0179052 A1 | 7/2013 | Kawakami |
| 2014/0053811 A1 | 2/2014 | De Ojeda et al. |
| 2014/0373822 A1 | 12/2014 | Rosswurm et al. |
| 2015/0000635 A1 | 1/2015 | Nishio |
| 2015/0094939 A1 | 4/2015 | D'Amato |
| 2015/0107557 A1 | 4/2015 | Teruaki |
| 2015/0219027 A1 | 8/2015 | Zur Loye et al. |
| 2015/0315993 A1 | 11/2015 | Nagai |
| 2015/0377166 A1 | 12/2015 | Yasuda |
| 2016/0017834 A1 | 1/2016 | Yun |

(56) References Cited

U.S. PATENT DOCUMENTS

| | | |
|---|---|---|
| 2016/0069287 A1 | 3/2016 | Lavertu |
| 2016/0177851 A1 | 6/2016 | Gruber et al. |
| 2016/0305351 A1 | 10/2016 | Barta et al. |
| 2017/0096932 A1 | 4/2017 | Domenico et al. |
| 2017/0342916 A1 | 11/2017 | Jung et al. |
| 2018/0245527 A1 | 8/2018 | Barta et al. |
| 2018/0321105 A1 | 11/2018 | Barta et al. |
| 2019/0040805 A1 | 2/2019 | Barta et al. |

FOREIGN PATENT DOCUMENTS

| | | |
|---|---|---|
| EP | 1375890 | 6/2005 |
| EP | 1538325 | 6/2005 |
| EP | 1705357 | 9/2006 |
| EP | 1905989 A2 | 4/2008 |
| EP | 1930571 A2 | 6/2008 |
| EP | 1953368 A2 | 8/2008 |
| EP | 2020496 | 2/2009 |
| EP | 3418542 | 12/2012 |
| EP | 2708722 A1 | 3/2014 |
| GB | 2471890 A | 1/2011 |
| JP | S57113344 | 7/1982 |
| JP | 2010014058 | 1/2010 |
| SE | 504197 | 12/1996 |
| WO | WO 2006011950 | 2/2006 |
| WO | WO 2017112967 | 7/2017 |

OTHER PUBLICATIONS

Barta et al., "Practical Cylinder Pressure Monitoring for Production IC Engines Combustion Control Using Real-Time Combustion Diagnostics and Control (RT-CDC) Module," 9th Dessau Gas Engine Conference, Copyright 2014, 5 pages.

Basshuysen, Richard van, Modem Technology from A to Z, 2007, pp. 15-17.

Cremers, "Beginnings for Cylinder Pressure Based Control," published in 2007, 116 pages.

PCT International Search Report and Written Opinion in International Appln. No. PCT/US2020/026713, dated Jul. 17, 2020, 16 pages.

Punater et al., "Controller for Rapid Development of Advanced Mode Combustion Algorithms using Cylinder Pressure Feedback," Oct. 20, 2008, 2 pages.

\* cited by examiner

AUTO-IGNITION CONTROL IN A COMBUSTION ENGINE

BACKGROUND

In premixed gas fueled engines, end-gas auto-ignition (EGAI) is usually the cause and pre-cursor to engine knock. Historically, engine knock is a destructive event with uncontrolled shock waves bouncing across the engine cylinder. The shock waves scrape away or collapse the boundary layer that thermally protects the cylinder walls, piston, cylinder head and valves from the high temperatures of the combustion event. Auto-ignition of this end-gas is typically prevented by lowering the compression ratio, retarding ignition timing and/or introducing exhaust gas recirculation (EGR) or excess air into the combustion chamber.

SUMMARY

In some aspects, a method of controlling combustion in an internal combustion engine includes measuring parameters of combustion in a cylinder of the engine during a combustion phase of the cylinder and after igniting an air/fuel charge in the cylinder, calculating the heat release of combustion in the cylinder based on the measured parameters, identifying, based on the calculated heat release, an auto-ignition event of the air/fuel charge, and controlling, based at least in part on the identified auto-ignition event, operation of the engine to cause an auto-ignition event of the air/fuel charge in the next combustion phase to shift toward a specified crank angle.

This, and other aspects, can include one or more of the following features. Identifying the auto-ignition event can include identifying an inflection point in the heat release that represents auto-ignition of a portion of the air/fuel charge. Controlling operation of the engine can include controlling at least one of ignition timing in the cylinder for the next combustion phase of the cylinder or controlling a characteristic of exhaust gas supplied to the cylinder for the next combustion phase of the cylinder. The method can include determining that the identified auto-ignition event occurs within a specified crank angle window or after a specified crank angle, and controlling the ignition timing in the cylinder can include advancing the ignition timing in the next combustion phase of the cylinder to shift the auto-ignition event earlier toward the specified crank angle. The method can include determining that the identified auto-ignition event occurs earlier in the combustion phase than a specified crank angle, and controlling the ignition timing in the cylinder can include retarding the ignition timing in the next combustion phase of the cylinder to shift the auto-ignition event later toward the specified crank angle. Controlling a characteristic of exhaust gas supplied to the cylinder can include controlling at least one of an amount of the exhaust gas or a temperature of the exhaust gas supplied to the cylinder. The method can include determining that the combustion in the cylinder has a burn duration greater than a specified burn duration, and controlling the amount of exhaust gas supplied to the cylinder can include decreasing the amount of exhaust gas supplied to the cylinder in the next combustion phase of the cylinder to decrease burn duration toward the specified burn duration. The method can include determining that the combustion in the cylinder has a burn duration less than a specified burn duration, and controlling the amount of exhaust gas supplied to the cylinder can include increasing the amount of exhaust gas supplied to the cylinder in the next combustion phase of the cylinder to increase burn duration toward the specified burn duration. Controlling the temperature of the exhaust gas supplied to the cylinder can include controlling the exhaust gas temperature with a cooler bypass. The method can include determining that the combustion in the cylinder has a burn duration greater than a specified burn duration, and controlling operation of the engine can include supplementing the air/fuel charge with an additional fuel or adjusting an amount of an additional fuel provided to the cylinder in the next combustion phase of the cylinder to decrease the burn duration toward the specified burn duration. The additional fuel can include hydrogen, diesel, gasoline, or propane. Controlling operation of the engine can include controlling, based at least in part on at least one of the combustion in the cylinder or the identified auto-ignition event, a timing of a micro pilot fuel injection to the cylinder for the next combustion phase of the cylinder. Calculating the heat release of combustion in the cylinder can include calculating at least one of the heat release rate or heat release integral. Measuring parameters of combustion can include sampling an in-cylinder pressure sensor of the cylinder of the engine, and calculating the heat release of combustion can include calculating the heat release rate of combustion in the cylinder based on the samples from the in-cylinder pressure sensor before the next combustion phase of the cylinder. Controlling operation of the engine can include controlling at least one of ignition timing in the cylinder for the next combustion phase of the cylinder, an amount of exhaust gas supplied to the cylinder for the next combustion phase of the cylinder, a temperature of the exhaust gas supplied to the cylinder for the next combustion phase of the cylinder, an amount of an additional fuel provided to the air/fuel charge in the cylinder in the next combustion phase of the cylinder, or a temperature of an air/fuel intake manifold. Controlling a temperature of an air/fuel intake manifold can include controlling the temperature of the air/fuel intake manifold with an intercooler.

Certain aspects encompass an engine control system for controlling ignition in an internal combustion engine, the control system including a processor and non-transitory computer readable medium coupled to the processor and storing instructions operable to cause the processor to perform operations. The operations include: (a) receive combustion parameters for a cylinder of the engine during a combustion phase of the cylinder, after igniting an air/fuel charge in the cylinder; (b) determine the heat release of combustion in the cylinder based on the measured parameters; (c) identify, based on the calculated heat release, an auto-ignition event of the air/fuel charge; and (d) control, based at least in part on the identified auto-ignition event, operation of the engine to cause an auto-ignition event of the air/fuel charge in the next combustion phase to shift toward a specified crank angle.

These, and other aspects, can include one or more of the following features. The engine control system can include a pressure sensor configured to measure pressure in the cylinder of the engine. Operation (a) can include sampling the in-cylinder pressure sensor, and operation (b) can include calculating combustion metrics based on the output of the in-cylinder pressure sensor, the combustion metrics including the heat release rate of combustion in the cylinder. Operation (c) can include identifying an inflection point in heat release that represents the ignition of the portion of the air/fuel charge that is not ignited by contact with a propagating flame front, and identifying a crank angle of a piston in the cylinder corresponding to the inflection point. The control of the operation of the engine of operation (d) can include controlling at least one of ignition timing in the cylinder for the next combustion phase of the cylinder or controlling a characteristic of exhaust gas supplied to the cylinder for the next combustion phase of the cylinder. Operation (d) can include advancing the ignition timing when the auto-ignition event occurred after the specified crank angle and retarding the ignition timing when the auto-ignition event occurred before the specified crank angle. Operation (d) can include controlling ignition timing by controlling the timing of a micro pilot fuel injection into the cylinder. Controlling a characteristic of exhaust gas supplied to the cylinder can include controlling at least one of an amount of the exhaust gas or a temperature of the exhaust gas supplied to the cylinder. Controlling a temperature of the exhaust gas supplied to the cylinder can include controlling the exhaust gas temperature with a cooler bypass. The control of the operation of the engine of operation (d) can include controlling at least one of ignition timing in the cylinder for the next combustion phase of the cylinder, an amount of exhaust gas supplied to the cylinder for the next combustion phase of the cylinder, a temperature of the exhaust gas supplied to the cylinder for the next combustion phase of the cylinder, an amount of an additional fuel provided to the air/fuel charge in the cylinder in the next combustion phase of the cylinder, or a temperature of an air/fuel intake manifold. Controlling a temperature of an air/fuel intake manifold can include controlling the temperature of the air/fuel intake manifold with an intercooler. The operations can include (e) determining that the combustion in the cylinder includes a burn duration of the combustion phase that is greater than a target burn duration; and (f) controlling a supply of enrichment fuel to the cylinder for the next combustion phase of the cylinder based on the burn duration being greater than the target burn duration. Operation (f) can include controlling a supply of hydrogen to the cylinder. The operations can include repeating operations (a)-(d) for each cylinder of the engine.

Some aspects encompass a method of controlling an engine, the method including measuring in-cylinder pressure in a cylinder of the engine during combustion of an air/fuel charge in the cylinder, determining, based on the in-cylinder pressure measurement, an auto-ignition of the air/fuel charge apart from ignition of the air/fuel charge by a propagating flame front, and controlling at least one of ignition timing, exhaust gas recirculation, or auxiliary fuel supply to the cylinder to change a timing of the auto-ignition toward a specified timing.

This, and other aspects, can include one or more of the following features. The specified timing can include a burn duration. The specified timing can include a timing selected to cause the heat release in the cylinder due to combustion of the air/fuel charge to have one peak.

DESCRIPTION OF DRAWINGS

Like reference symbols in the various drawings indicate like elements.

DETAILED DESCRIPTION

Figure 1:
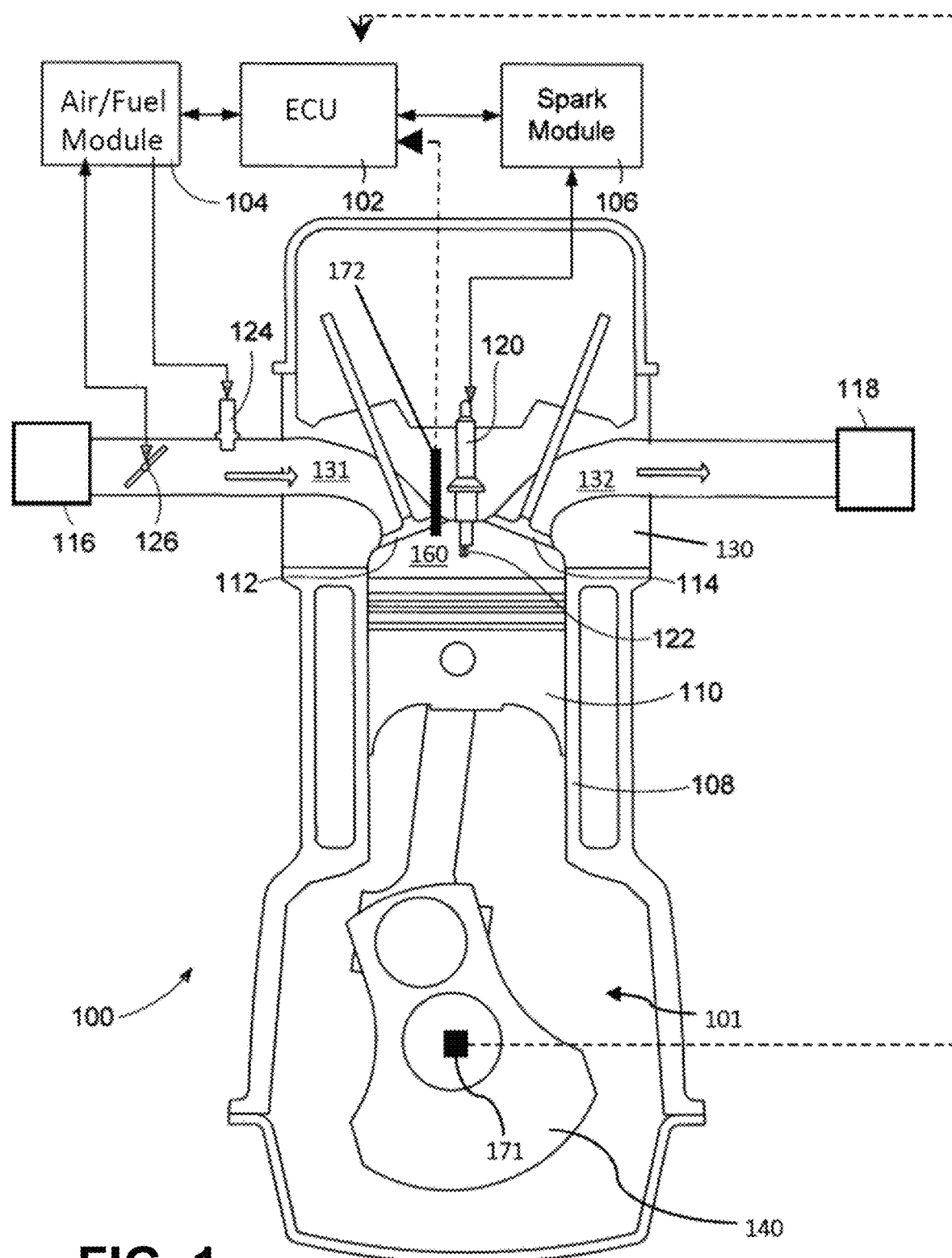
FIG. 1 is a schematic of an engine system with an engine control system.

The concepts herein encompass controlling combustion in an engine, and in particular, to control combustion of the air/fuel mixture that might otherwise manifest as engine knock. End-gas auto-ignition (EGAI) is a result of auto-ignition of air/fuel mixture in the engine cylinder that is not ignited by the flame kernel or propagating flame front initiated by the spark plug or other igniter. These auto-ignition events can generally manifest as knock and typically occur at the peripheral areas of an engine cylinder. In some conventional engine systems, engine control systems supply an engine cylinder with exhaust gas to suppress the auto-ignition events to avoid engine knock. However, in suppressing auto-ignition events, the control strategies implemented by conventional engine systems use accelerometer based knock sensors which pick up only detectable engine knock (i.e. audible) and employ large margins by retarding timing such that the combustion phasing is "far from knock" and thus create inefficiencies, including a less efficient combustion phasing.

The present disclosure describes the use of real-time combustion feedback and the control of ignition timing, exhaust gas recirculation (EGR) rate or amount, intake manifold temperature, EGR temperature, fuel (e.g., hydrogen, propane, gasoline, diesel, or other) composition or enrichment, or a combination of these, together with control of other parameters, to control the auto-ignition and combustion of air/fuel mixture that is not ignited by contact with the propagating flame front such as end-gas, for example, to create a more complete combustion event in an engine cylinder. For example, instead of simply adding significant amounts of exhaust gas to a cylinder (which reduces combustion efficiency) to attempt to suppress auto-ignition, the present disclosure describes adjusting the ignition timing, exhaust gas supply to a cylinder, and/or fuel supplied to a cylinder based on combustion metrics of a previous (e.g., immediately prior) combustion event in the cylinder to phase these auto-ignition events to combust concurrently either simultaneously or in a controlled, grouped manner. And, in some examples, the auto-ignition events are phased to combust together with the propagating flame front, which produces a shorter burn duration and a more complete combustion in the cylinder without or with a low likelihood of engine knock. Controlling the auto-ignition of these portions of the air/fuel charge can mitigate damage caused by uncontrolled (and therefore heavy) knocking, achieve auto-ignition of the air/fuel charge portions without engine knocking, shorten burn duration of the combustion cycle, burn otherwise poor combustion species (such as unburned hydrocarbons (UHC), methane, carbon monoxide (CO), or other gasses), and contribute to better efficiency.

In the absence of cycle to cycle control, EGAI is likely to progress from no knock, to light knock, to heavy knock quickly in an "uncontrolled" progression. What is proposed here is to maintain a stable operating point with auto-ignition, but below the threshold of uncontrolled run-away heavy knock and pre-ignition. In short, there is a operable window between no EGAI and heavy destructive knock, where we propose to operate (e.g., this is similar to flying an unstable aircraft by use of rapid control adjustments to keep it stable, if the stability control is turned off, it will surely crash).

In some examples, a measured heat release rate from a combustion cycle can indicate the presence and timing of auto-ignition events of air/fuel mixture that ignite before being ignited by contact with the propagating flame front. Adjusting an ignition timing, or amount of or temperature of exhaust gas supplied to the cylinder, can adjust the timing of auto-ignition of portions of the air/fuel mixture to a specified phase during combustion that is beneficial (or at least benign) to engine power output and/or can adjust the burn duration (or burn rate) of the air/fuel charge in the cylinder during the combustion event. Adjusting the ignition timing and/or exhaust gas recirculation quantity and/or temperature can promote a more complete combustion event in the cylinder by phasing the auto-ignition occurrences to better align with the progression of the flame front and/or by phasing the auto-ignition occurrences to ignite together, concurrently in a consolidated burst (for example, to peak at a specified crank angle or combust over a specified range of crank angles). In certain instances, additional fuel, the same as or different from the fuel in the main air/fuel mixture, can be added to affect the phasing and burn duration of the auto-ignition occurrences. For example, hydrogen can be added to the cylinder. In a micro pilot ignited engine, the micro pilot fuel timing can be controlled to affect phasing and burn duration of the auto-ignition occurrences. Also, in certain instances, additional parameters can be controlled to affect the phasing and burn duration of the auto-ignition occurrences. These additional parameters can include (a) fumigation of a more reactive fuel such as hydrogen, diesel fuel, or even engine oil or gasoline, (b) early injection of a pilot diesel (near intake value closure), which can be followed by a second injection which ignites the charge (the early injected fuel parcels are thus relatively pre-mixed and stand ready to "go off" when the combination of pressure and temperature of the propagating flame provide the conditions that lead to enhanced EGAI above what would have occurred without the seeded particles), (c) adjusting the cylinder minimum volume and thus compression ratio, (d) the degree of effective compression ratio using variable valve timing, or a combination of these.

In some instances, high-frequency in-cylinder sensors measure pressure, temperature, and other parameters of the engine cylinder, and are processed by a companion controller or an engine control unit (ECU). The controller/ECU includes an embedded processor with, in certain instances, the capability to process high-speed cylinder data with resolution as fine as 0.25 degrees crank and capable of producing a comprehensive suite of diagnostics for monitoring combustion, as well as filtering and averaging the combustion diagnostics, in real-time, i.e., concurrent with the engine operation and current enough for use in a control loop for controlling the engine. In some instances, the "real-time" operation is such that the controller/ECU can process the in-cylinder sensor data rapidly enough to control the immediately following combustion cycle of the same cylinder. The real-time combustion metrics calculated by the controller/ECU can include location, in crank angle or time, of pressure and/or temperature within one or more of the cylinders. In some examples, the controller/ECU can calculate an adiabatic heat release rate of a combustion phase in an engine cylinder prior to a next combustion cycle in the engine cylinder. The adiabatic heat release rate can be calculated on a cylinder-by-cylinder basis, along with the locations in crank angle or time of 10%, 50%, 90%, or other percent of the per-cycle mass fraction burned during combustion (CA10, CA50 (also known as center of combustion (CoC), CA90, and CAX, respectively), the duration of the per-cycle combustion, as well as other combustion diagnostic metrics derived from pressure signals and/or temperature signals, such as IMEP (indicated mean effective pressure), polytropic coefficients (K, indicative of compression quality of the cylinder), and/or combustion stability (COV of IMEP).

The controller/ECU can further identify the number and location of heat release peaks in the heat release rate, and an inflection point in the heat release rate that represents the auto-ignition of end-gas, which is a portion of the air/fuel charge in the cylinder that is auto-ignited before being ignited by contact with a propagating flame front of a flame kernel generated by spark ignition (or other primary ignition source). The controller/ECU can then adjust parameters of the combustion to control the timing of the inflection point, the timing and duration of the peak or peaks in the heat release rate due to auto-ignition, or other aspects of the heat release. The controlled parameters include at least one of the timing of the spark (or other ignition source) in the cylinder, an amount of exhaust gas supplied to the cylinder, a temperature of the exhaust gas supplied to the cylinder, an amount of an additional fuel supplied to the cylinder, and/or a temperature of the intake charge (for example, via CAC bypass). Other parameters can also be adjusted to control combustion in the cylinder. The adjusted timing of the auto-ignition events can be selected such that the auto-ignition of the end gas is benign (i.e., does not cause engine knock or substantial engine knock) and, in certain instances, even beneficially contributes to combustion by phasing the peak of the auto-ignition heat release rate to coincide or substantially coincide with the heat release rate peak of the spark ignited combustion. A benefit of this auto-ignition event timing includes the rapid burning of the otherwise hard to burn gases that are near the cylinder/piston/head wall surfaces and where bulk turbulence and temperatures are dropping due to piston expansion, and even due to unburned gases returning to the combustion chamber after hiding out in the crevice region above the top piston ring. The rapid burning of this hard-to-burn gases leads to reduced burn duration (which can benefit efficiency), advancement of CA50/COC, and improved combustion efficiency by burning gases which would otherwise be exhausted unburned, benefiting both higher efficiency and reducing emissions.

In some instances, auto-ignition events can be controlled to occur on or after TDC of a piston in the cylinder, together, concurrently either simultaneously or in a consolidated burst (as opposed to several auto-ignition events that occur at multiple, discrete and spaced apart points in time or crank angle positions). Controlling the auto-ignition events to occur in this consolidated burst, and in phase with the heat release rate of the propagating flame front, can increase a total mass fraction of burned air/fuel mixture of the combustion phase in the cylinder, while also shortening a burn duration due to concurrent combustion of the portion of the air/fuel mixture that is not combusted due to contact with the propagating flame front of the flame kernel.

In some instances, an engine system can include an embedded real-time combustion diagnostics and control (RT-CDC) processor that incorporates, is connected to (e.g., as a companion controller), or integrated with the ECU and communicates with high-frequency in-cylinder sensors. The RT-CDC uses in-cylinder measurements (e.g., pressure, temperature, or other) to determine combustion metrics, and can output combustion parameters from a combustion cycle of the engine. The combustion parameters can include a heat release (including total and rate), which can be used to determine characteristics of auto-ignition of portions of an air/fuel charge that are not combusted by the propagating flame front of an ignitor produced flame kernel and to provide an adjustment to a spark timing and/or exhaust gas supply to the cylinder and/or fuel addition in a subsequent combustion phase to control (and ideally optimize) auto-ignition events in the cylinder. Basic engine control (such as control of fuel, ignition, and/or EGR) is performed either by the ECU using input from an oxygen sensor in the exhaust and either a MAF or a MAP with throttle position sensor, and/or basic engine control is performed using combustion metrics from the RT-CDC. The control that is performed by this algorithm (e.g., adjusting the ignition timing, EGR, and/or fuel enrichment) adjusts on top of that basic engine control. The amount of adjustment (e.g., to ignition timing, EGR, and/or fuel enrichment) is also bound by the basic engine control. For example, the EGR can be adjusted to control the auto-ignition, but only to the extent the engine maintains a NOx production below a specified amount.

Referring to FIG. 1, an example engine system 100 with an engine control system usable with aspects of the present disclosure is shown. The engine system 100 includes an engine control unit (ECU) 102, an air/fuel module 104, an ignition module 106 (e.g., spark module), and an engine 101 (shown here as a reciprocating engine). FIG. 1 illustrates, for example, an internal combustion engine 100. For the purposes of this disclosure, the engine system 100 will be described as a gaseous-fueled reciprocating piston engine. In certain instances, the engine 101 operates on natural gas fuel. The engine 101 may be any other type of combustion engine, both in the type of fuel (gaseous, liquid (e.g., gasoline, diesel, and/or other), same phase or mixed phase multi-fuel, and/or another configuration) and the physical configuration of the engine (reciprocating, Wankel rotary, and/or other configuration). While the engine control unit 102, the air/fuel module 104 and the ignition module 106 are shown separately, the modules 102, 104, 106 may be combined into a single module or be part of an engine controller having other inputs and outputs.

The reciprocating engine 101 includes engine cylinder 108, a piston 110, an intake valve 112 and an exhaust valve 114. The engine 101 includes an engine block that includes one or more cylinders 108 (only one shown in FIG. 1). The engine 100 includes a combustion chamber 160 formed by the cylinder 108, the piston 110, and a head 130. An igniter 120 (e.g., spark plug, laser, hot surface igniter, microwave igniter, direct fuel injector and/or another type of ignition source—each with or without a prechamber) is positioned within the head 130 which enables the ignition device access to the combustible mixture. An ignition location 122 of the igniter 120 is positioned within the combustion chamber 160. In the case of a spark plug, the ignition location 122 is a spark gap, i.e., an arrangement of two or more electrodes with a small space in-between. When an electric current is applied to one of the electrodes, an electric arc is created that bridges the small space (i.e., the spark gap) between the electrodes. The piston 110 within each cylinder 108 moves between a top-dead-center (TDC) position and a bottom-dead-center (BDC) position. The engine 101 includes a crankshaft 140 that is connected to each piston 110 such that the piston 110 moves between the TDC and BDC positions within each cylinder 108 and rotates the crankshaft 140. The TDC position is the position the piston 110 with a minimum volume of the combustion chamber 160 (i.e., the piston's 110 closest approach to the igniter 120 and top of the combustion chamber 160), and the BDC position is the position of the piston 110 with a maximum volume of the combustion chamber 160 (i.e., the piston's 110 farthest retreat from the igniter 120 and top of the combustion chamber 160).

The cylinder head 130 defines an intake passageway 131 and an exhaust passageway 132. The intake passageway 131 directs air or an air and fuel mixture from an intake manifold 116 into combustion chamber 160. The exhaust passageway 132 directs exhaust gases from combustion chamber 160 into an exhaust manifold 118. The intake manifold 116 is in communication with the cylinder 108 through the intake passageway 131 and intake valve 112. The exhaust manifold 118 receives exhaust gases from the cylinder 108 via the exhaust valve 114 and exhaust passageway 132. The intake valve 112 and exhaust valve 114 are controlled via a valve actuation assembly for each cylinder, which can be electronically, mechanically (e.g., via a camshaft), hydraulically, or pneumatically controlled, or controlled in another manner. In some instances, the intake manifold 116 includes a heat exchanger, or intercooler, to control a temperature of an incoming air or air/fuel charge through the intake manifold and into the intake passageway 131 toward the combustion chamber 160. The heat exchanger allows air to conduct across fins or other structure of the heat exchanger to heat or cool air flowing through the intake manifold 116. The intake manifold 116 can include a valve that selectively routes the air charge through the heat exchanger or not, for temperature control of the air charge from the intake manifold 116. In certain instances, the exhaust manifold 118 includes a heat exchanger, referred to as a bypass charge cooler, that controls a temperature of exhaust gas in the exhaust manifold 118. In some examples, the heat exchanger exchanges heat between exhaust gas and a cooler fluid (such as ambient air, engine coolant, or another cooler fluid). The exhaust manifold 118 can include a valve that selectively routes the charge gas through the bypass cooler or not, for temperature control of the exhaust charge.

In certain instances, the engine 101 is a four stroke engine. Movement of the piston 110 between the TDC and BDC positions within each cylinder 108 defines an intake stroke, a compression stroke, a combustion or power stroke, and an exhaust stroke. The intake stroke is the movement of the piston 110 away from the igniter 120 with the intake valve 112 open and air or a fuel/air mixture being drawn into the combustion chamber 160 via the intake passageway 131. The compression stroke is movement of the piston 110 towards the igniter 120 with the air or air/fuel mixture in the combustion chamber 160 and both the intake value 112 and exhaust valve 114 are closed, thereby enabling the movement of the piston 110 to compress the fuel/air mixture in the combustion chamber 160. The combustion or power stroke is the movement of the piston 110 away from the igniter 120 that occurs after the compression stroke when the igniter 120 ignites the compressed fuel/air mixture in the combustion chamber at the ignition location 122. The ignited fuel/air mixture combusts and rapidly raises the pressure in the combustion chamber 160, applying an expansion force onto the movement of the piston 110 away from the igniter 120. The exhaust stroke is the movement of the piston 110 towards the igniter 120 after the combustion stroke and with the exhaust valve 114 open to allow the piston 110 to expel the combustion gases to the exhaust manifold 118 via the exhaust passageway 132.

The engine 100 includes a fueling device 124, such as a fuel injector, gas mixer, or other fueling device, to direct fuel into the intake manifold 116, intake passageway 131, or directly into the combustion chamber 160. In the example engine system 100 of FIG. 1, the fueling device 124 is coupled to the intake passageway 131 and provides fuel to the intake passageway 131. In some instances, the engine 100 is a dual fuel engine having two sources of fuel (directly or indirectly) into the combustion chamber 160. For example, the dual fuel engine can include a second fueling device that provides a second fuel to the air/fuel charge in the cylinder. The second fueling device can be connected to and controlled by the air/fuel module 104, ECU 102, or both, to selectively provide a hydrogen enrichment solution (or other fuel enrichment) to the cylinder. In some instances, a throttle valve 126 is disposed in the intake passageway 131 to at least partially control a flow rate of air or air/fuel mixture through the intake passageway 131.

In some instances, the engine system 100 can include another type of internal combustion engine 101 that doesn't have pistons/cylinders, for example, a Wankel engine (i.e., a rotor in a combustion chamber). In some instances, the engine 101 includes two or more igniters 120 in each combustion chamber 160.

During operation of the engine system 100, i.e., during a combustion event in the combustion chamber 160, the air/fuel module 104 supplies fuel to a flow of incoming air in the intake manifold before entering the combustion chamber 160. The ignition module 106, or spark module, controls the ignition of the air/fuel mixture in the combustion chamber 160 by regulating the timing of the creation of the ignition event at the ignition location 122, which initiates combustion of the fuel/air mixture within the combustion chamber 160 during a series of ignition events between each successive compression and combustion strokes of the piston 110. During each ignition event, the ignition module 106 controls ignition timing and provides power to the primary ignition coil of the igniter 120. The air/fuel module 104 controls the fuel injection device 124, and can control the throttle valve 126 to deliver air and fuel at a target ratio to the combustion chamber 160 of the engine cylinder 108. The air/fuel module 104 receives feedback from engine control module 102 and adjusts the air/fuel ratio. The ignition module 106 controls the igniter 120, for example, by controlling the operation of an ignition coil electrically coupled to the igniter 120 and supplied with electric current from a power source. The ECU 102 regulates operation of the ignition module 106 based on the engine speed and load and in addition to aspects of the present system disclosed below.

In some instances, the ECU 102 includes the ignition module 106 and the air/fuel module 104 as integrated software algorithms executed by one or more processors of the ECU 102, and thereby operate the engine system 100 as single hardware module, in response to input received from one or more sensors (not shown), which may be located throughout the engine 101. In some instances, the ECU 102 includes separate software algorithms corresponding to the described operation of the fuel/air module 104 and the ignition module 106. In some instances, the ECU 102 includes individual hardware modules that assist in the implementation or control of the described functions of the fuel/air module 104 and the ignition module 106. For example, the ignition module 106 of the ECU 102 may include an application specific integrated circuit (ASIC) to regulate electric current delivery to the ignition coil of the igniter 120. A plurality of sensor systems exist to monitor the operational parameters of an engine 101, which may include, for example, a crank shaft sensor, an engine speed sensor, an engine load sensor, an intake manifold pressure sensor, an in-cylinder pressure sensor, etc. Generally, these sensors generate a signal in response to an engine operational parameter.

For example, a crank angle sensor 171 reads and generates a signal indicative of the angular position of the crankshaft 140. In an exemplary embodiment, a high speed pressure sensor 172 measures in-cylinder pressure during operation of the engine 100. The sensors 171, 172 can be directly connected to the ECU 102 to facilitate the sensing, or, in some instances, are coupled with a real-time combustion diagnostic and control (RT-CDC) unit configured to acquire high speed data from one or more of the sensors, and provide a low speed data output to the ECU 102. In some instances, the ignition control described herein is a stand-alone ignition control system providing the operation of ECU 102 and the ignition module 106. Other sensors can also be included in the engine system 100, and the systems described herein can include more than one such sensor to facilitate sensing one or more or all of the engine operational parameters mentioned above.

Figure 2:
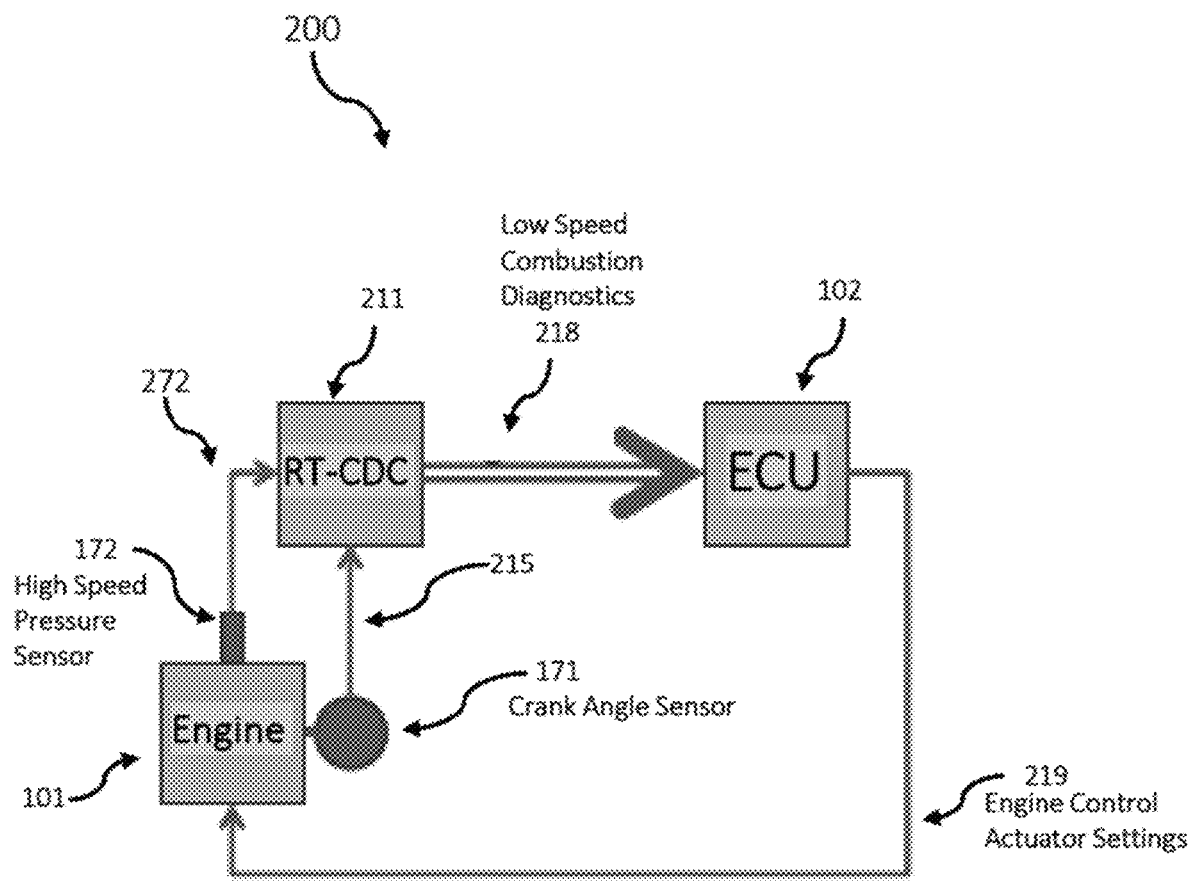
FIG. 2 is a schematic view of an engine control system.

FIG. 2 is a schematic view of an engine control system 200 of the engine system 100 of FIG. 1. FIG. 2 shows the ECU 102 within the engine control system 200 configured to control the engine 101 with a separate, companion RT-CDC 211. In other instances, the functions of the RT-CDC 211 can be performed by the ECU 102. As indicated above, high-speed pressure data 272 is generated by one or more pressure sensors 172, each mounted with direct access to the combustion chamber 160 of the engine 101. The pressure signal 272 is captured at a high crank-synchronous rate, for example, 0.25° resolution or 2880 samples per cycle of the engine 101. While in some instances, the crank angle sensor 171 can be a high resolution sensor, in other instances, a synthetic crank angle signal can be generated from a lower resolution crank position signal. For example, with a typical crank angle sensor (or crank angle encoder) generating a crank angle signal 215 by sensing passage of the edge of teeth on a disk, the disk mounted to rotate with the crank, the resolution of the crank position is based on the number of teeth. A typical 60-2 tooth wheel has a resolution of 6°. However, in some instances, interpolation is used to determine a crank angle in the space between of the edges. Thus, the spacing between edges uses the previously observed tooth period divided by the number of edges required to achieve the desired angular sampling resolution. To account for minor variability between the crank teeth that can be seen even when the average engine speed is constant, and the encoder system is re-synchronized on each edge.

In some instances, the resulting high-resolution pressure signal 272 is used by the combustion diagnostics routine in the Real-time Combustion Diagnostics and Control (RT-CDC) 211 module to produce combustion diagnostics 218 on a per-cylinder, per cycle basis, for example, IMEP, $P_{max}$, CA50, CAX, combustion quality, and combustion intensity, as discussed in more detail below. The metrics of the combustion diagnostics 218 are subsequently used by the ECU 102 as a feedback signal for adjusting combustion performance characteristics by modulating engine control actuator settings 219 (e.g., spark timing, EGR, etc.).

The RT-CDC 211 operates with one or more processors for the determination of combustion metrics and, if not included in the ECU 102, communicates with the ECU 102 that operates with one or more processors for engine control. The RT-CDC 211 accepts inputs from a crank angle sensor 171, pressure sensor 172, temperature sensor (not shown), and/or other sensors connected to the engine 101. For each cylinder, the RT-CDC 211 calculates combustion metrics from the input data from sensors 171 and 172. In the RT-CDC 211, for each cylinder, one or more processors can define all constants, including vectors via engine geometry, then the in-cylinder measurements (e.g., pressure, temperature, crank angle) are capture, in some instances, at a specified sampling rate defined by a sampling rate window. Next, the raw pressure data is parsed into vectors according to the corresponding crank angle, and combustion metrics are calculated using predefined vectors and the pressure vector. Finally, the heat release rate and combustion durations (i.e., 10%, 50%, and 90% burn) are calculated.

The RT-CDC 211 stores the results of the per-cylinder combustion metrics, and uses real-time heat release calculations to operate a dual-fuel engine to meet a target combustion that controls the auto-ignition events of end gas (i.e., portions of the air/fuel mixture that are not ignited by contact with the propagating flame front of the flame kernel). For example, ignition timing can be determined via the real-time heat release calculation, and the ignition timing, exhaust recirculation rate, and/or other parameters are adjusted by the ECU 102 to achieve a phasing target in a next combustion cycle of the engine cylinder. In some examples, a target crank angle (CAX2, where X2 is specified), where the target crank angle corresponds to a crank angle that a target percentage of heat energy of combustion is released, and is determined via the real-time heat release calculation, and the ECU 102 adjusts engine control parameters to meet a set point. In some instances, the ECU 102 meets the set point by adjusting an ignition timing and/or exhaust fuel recirculation rate.

Optionally, and as discussed in more detail below, the RT-CDC 211 (or an ECU 102 with the functionality of the RT-CDC 211) can employ a high efficiency processing method that enables processing of over fifteen combustion metrics per each cylinder for each cycle, while being fit in a standard automotive production ECU with maximum allowable processor and memory. In particular, the vector of pressure readings from the cylinder pressure sensor is sampled at different resolutions based on where the cylinder is in the combustion cycle. Thus, the vector is sampled at the highest resolution during only the most critical times, and the total amount of data processed is reduced. In addition, data is able to be collected and processed from the same memory for all cylinders.

In some instances, simultaneous control of a combustion phasing metric, for example, centroid of heat release (CA50, a metric derived from high speed processing of heat release rate for every cycle), is conducted with actuation of combustion triggering phasing (e.g., spark advance or diesel start of injection) concurrently with simultaneous control of a combustion energy metric (e.g., IMEP). This simultaneous control is achieved through actuation of fuel, either in-cylinder, in a diesel configuration, or in extra-cylinder in, for example, in-port injection of natural gas or gasoline.

In some instances, real time processing of derived compression and expansion polytropic coefficients from the pressure signals are used for high quality heat release rate calculations. The heat release rate calculations include diagnostics of compression curve quality via calculation of motored pressure curve. Motored pressure is the pressure in the cylinder without combustion. The heat release rate can diagnose changes in cylinder and pressure sensor quality via deviations from the expected compression curve, and signify auto-ignition in the engine cylinder. In some instances, the polytropic constants are recorded over time to determine a rate of drift of pressure sensor or cylinder compressive quality due to ring and/or valve tightness.

Example Gas Engine Control Using in-Cylinder Pressure

Typical gas engines today, for example natural gas engines, are operated with fixed spark timing along with an in-factory calibration for air/fuel ratio (AFR) control. This typical configuration may provide a good knock margin and meet emissions norms on a firing engine put into operation. However, for some engines, the spark timing and AFR are set such that the center of combustion or CA50 (time of 50% fuel burn) are maintained in a relatively retarded location between 15° and 20° after top dead center (ATDC). These settings are considered conservative and are set such that the worst envisioned fuel gas quality would not lead to engine-damaging knock. In this type of calibration, a provided knock sensor is utilized only in extreme conditions; otherwise, the knock signature is relatively low. The result of this configuration is that while meeting NOx emissions norms, engines running with 'good fuel' (i.e., having low knock tendency by virtue of a high methane number (MN)) are running with a less-than-optimal fuel consumption during most or all of the time they are in operation. This loss of potential fuel economy can be, for example, as high as 1-4%.

In contrast, some engines use a more aggressive strategy wherein the knock sensor is used more intentionally for combustion phasing control. The assumption is that advancing combustion phasing to the point of light knock gives the best fuel efficiency. This is especially true with J-gap spark plugs, which have high cycle-to-cycle variation. In these systems, if the fuel quality changes with a drop in MN, there is time for the knock to register in the controller and appropriate spark timing or AFR lean can be achieved to accommodate. This strategy depends upon the knock sensor working. Additionally, when going to better ignition methods such as prechamber spark plugs and fuel fed prechambers, where the cycle to cycle variation is smaller and the combustion rate faster, that the condition of "light knock" would be overly advanced combustion and would be less efficient.

Additionally, there is no method in the aforementioned two configurations to keep cylinder pressure below the mechanical limits or keep the rate of pressure rise rate below the mechanical limit. Additionally, when fuel quality or AFR goes in the opposite direction, that is, leading toward poor combustion and misfire, typically the only method of detection on existing engines is by monitoring cylinder exhaust port temperatures. However, this leads to an ambiguous monitored condition, as high temperatures indicated late combustion while very low temperatures indicate misfire. Misfire is also indicated by instantaneous shaft speed variations, which can be used to corroborate a low temperature reading as a diagnostic of misfire.

One problem with the above systems can be maintaining the engine below the knock limit with consistency and with efficient combustion, especially when fuel quality changes, when the atmospheric conditions change, and other engine parameters vary between combustion cycles. The systems detailed below address the problem by using real-time in-cylinder combustion metrics to calculate a heat release rate and total heat release of an engine on a per-cycle basis, determine the timing and position of auto-ignition events, and adjust the spark timing, combustion phasing, air quality (EGR), hydrogen enrichment to the air/fuel charge, and/or burn duration to allow for controlled auto-ignition events while staying below a damaging knock limit.

Controlling Auto-Ignition Events

In some instances, a combustion feedback system (e.g., RT-CDC 211 and ECU 102) provides identification of and control over engine charge conditions (such as MAT, MAP, EGR rate, and spark timing), which can provide a very repeatable combustion event with very good cycle to cycle consistency (i.e., low COV of IMEP). In some examples, cylinder pressure measurements, heat release rates, or other measurements can be traced on top of each other for multiple (e.g., consecutive) combustion cycles to determine the consistency or a lack of consistency between cycles. The combustion cycles can be ignited by a "Low COV igniter," such as a prechamber. With consistent combustion, end gas auto-ignition events are visible on both an individual heat release trace as well as on a multiple cycle average with a combustion feedback system such as an RT-CDC 211 or ECU 102 with such functionality, enabling control of the next cycle by monitoring of the previous cycle or average thereof. In some instances, a measured heat release rate can be partitioned into the fraction of the air/fuel charge that burns via the propagating flame (i.e., propagating flame front from a primary flame kernel) and the fraction of the air/fuel charge that burns via an auto-ignition event (and not by the propagating flame). From the measured heat release, one or more auto-ignition events in the combustion phase can be identified, and at least one of the timing of the spark in the cylinder, an amount (or rate) of exhaust gas supplied/recirculated to the cylinder, a temperature of the exhaust gas supplied/recirculated to the cylinder, Intake Manifold temperature, or an amount (or rate) of fuel (e.g., hydrogen) enrichment or micro pilot injection to the air/fuel charge supplied to the cylinder for the combustion phase of the next cycle can be adjusted to control the auto-ignition events in the next combustion cycle.

Figure 3:
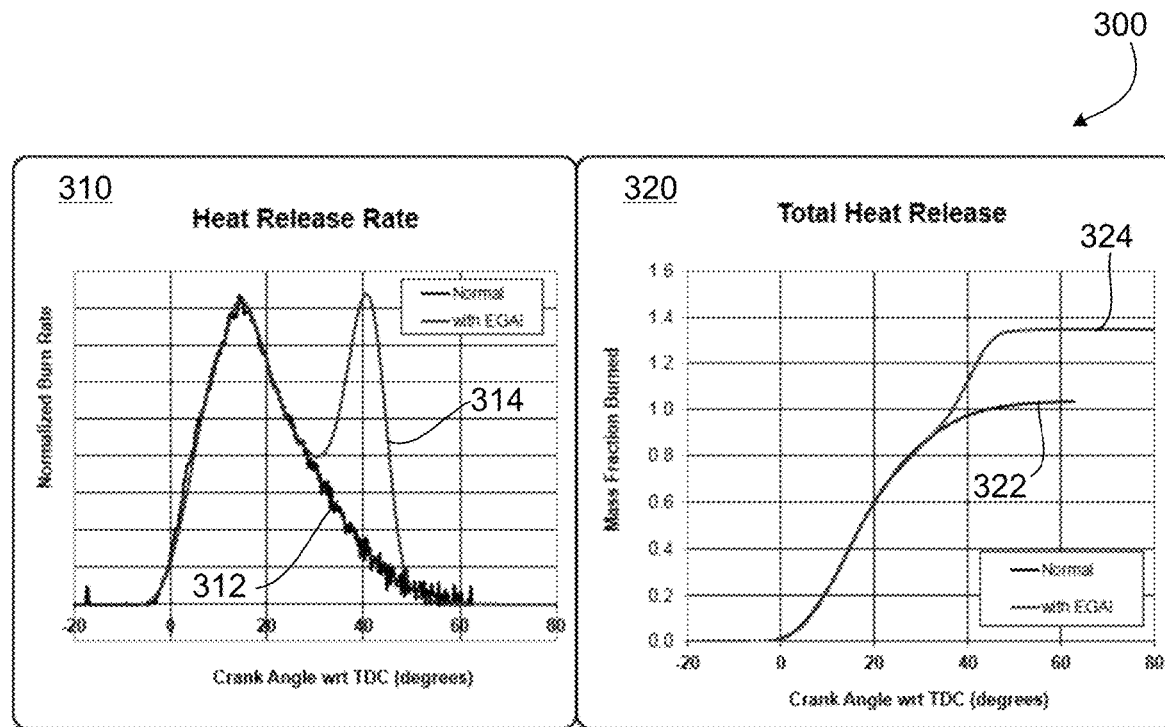
FIGS. 3 and 4 are plots for example combustion cycles in an engine cylinder showing heat release versus crank angle.

For example, FIG. 3 is graphs 300 of heat release vs crank angle for a cylinder showing example normal combustion and example end gas auto-ignition (EGAI) combustion. In particular, FIG. 3 shows a first plot 310 of an example heat release rate over crank angle for normal (flame front ignited) combustion 312 and for EGAI 314, and a second plot 320 of an example total heat release over crank angle for normal combustion 322 and for EGAI 324. Second plot 320 is the integral of the heat release rate of the first plot 310. In the first plot 310 and the second plot 320, the crank angle ranges from 20 degrees BTDC to 80 degrees ATDC. As indicated in the first plot 310, the heat release rate for end gas auto-ignition diverges from normal combustion heat release rate at a crank angle position starting around 30 degrees ATDC at a point of about 80-90% fuel burned in a propagating flame. This diversion is clearly shown in the second peak of the curve 314. Referring to the integral curves 322 and 324 of the second plot 320, the point of departure of the total curves from each other is about at an inflection point of the total heat release curve 324, where the slope is "concave up" as opposed to the concave down slope of 322 from about 20 ATDC onward. This means that for the heat release rate of normal combustion 312, the rate increases from initiation to a peak around 15 ATDC, at which point the burn rate slows down due to piston expansion, which lowers temperatures and turbulence levels in the cylinder, and due to combustible gas moving out into the periphery where the piston and cylinder liner temperatures are lower. On the other hand, the second curve 314 shows concurrent, controlled and consolidated auto-ignition of the end gas, leading to a change in this monotonic decline in heat release rate after the peak at 15 ATDC. This end gas combustion rate is associated with the auto-ignition event of the end gas. It is considered beneficial if the hard-to-burn gas (i.e., the end gas that is not ignited by contact with the propagating flame front) does indeed go off concurrently. The result is a shorter and more complete total combustion event, which is good for higher efficiency and lower emissions.

To control this auto-ignition event, the RT-CDC 211 (or ECU 102 with RT-CDC functionality) can provide real time combustion feedback to monitor the location of the Xb burn fraction (where X is a specified % burn), where an example would be 75% burn (i.e., 75b). In some instances, the spark timing can be adjusted on a fast loop to maintain the Xb location to the target set point. In certain instances, the EGR rate can be adjusted on a slower loop to maintain "mid ranging" of the fast parameters (i.e., adjusting EGR rate to maintain the spark advance at a specified set point). Alternatively, or in addition, the EGR rate can be used in a control loop to adjust the total width of the heat release rate or the burn duration. In some instances, with fixed or slow changing spark timing, the EGR rate can be used to control the Xb point to a specific crank angle. For example, an increase in EGR decelerates combustion for a slower burn and longer burn duration, and a decrease in EGR accelerates combustion for a faster burn and shorter burn duration. In certain instances, hydrogen enrichment or other fuel enrichment can be applied and adjusted, for example, increased to accelerate combustion for a faster burn, and shorter burn duration, or decreased to decelerate combustion for a slower burn, and longer burn duration. In some examples, EGR temperature, intake manifold temperature, or both, can be controlled such that higher charge temperature advances combustion and burns faster, and lower charge temperature retards combustion and burns slower. For example, control of the auto-ignition events can include adjusting the EGR temperature (via a controlled EGR cooler bypass rate) such that higher EGR temperatures will lead to shorter burn duration and earlier phasing of the EGAI event, and lower EGR temperatures will lead to longer burn duration and later EGAI phasing.

Aggressive Controlled EGAI

Figure 4:
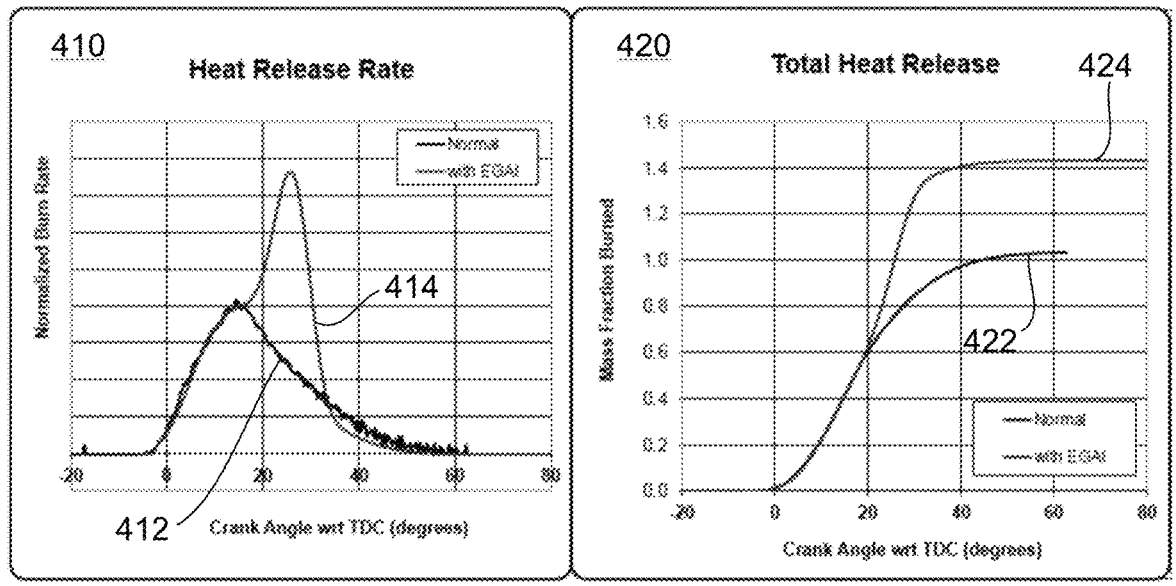

FIG. 4 is graphs 400 of heat release vs crank angle for a cylinder showing example normal combustion and example end gas auto-ignition combustion when the concepts herein are applied. The graph 400 is similar to graph 300 of FIG. 3, except the ignition timing, EGR, and/or other parameters have been controlled to advance the EGAI combustion and produce a higher heat release rate, a higher normalized burn rate, and a shorter burn duration. The graph 400 includes a first heat release rate plot 410 showing heat release rate vs crank angle for normal combustion 412 and for combustion with end gas auto-ignition 414, and a second plot 420 of total heat release showing integrated heat release for normal combustion 422 and for combustion with end gas auto-ignition 424. The graph 400 represents an example aggressive auto-ignition event, where 50% or more of the air/fuel mixture is burned in an auto-ignition event (0.5 on integral curve 420). Notably, the EGAI combustion has been advanced to occur in tandem and together, concurrently with the heat release of the flame front ignited ignition, rather than late in the combustion phase and separated as shown in FIG. 3. In other words, the ignition timing, EGR and/or other parameters have been controlled according to the concepts herein to consolidate the EGAI heat release to the flame front ignited heat release so that the increase in the EGAI heat release rate begins to build before the flame front ignited heat release rate begins to decline or has substantially declined. The resulting heat release rate has only one peak, instead of two as depicted in FIG. 3. The first heat release rate plot 410 shows an inflection point of the combustion curve 414 at around 15 degrees crank angle ATDC, where the heat release rate transitions to concave up, signifying the effect of the end gas auto-ignition on the heat release rate in the cylinder. The total heat release plot 410 has a continuous concave-up nature, without the momentary convex curvature of FIG. 3. In some examples, if a true triangle-shape is achieved in the heat release rate curve 414 (not shown in FIG. 4), the total heat release curve 414 would be consistently concave up until proximate to the maximum total heat release, since the integral of a triangle is a parabola which is always concave up. Also, the concurrent combustion of the auto-ignition event curve 414 produces a shortening of the burn duration (as compared to normal combustion curve 412).

In the aggressive case shown in FIG. 4, more than 50% of the heat release occurs in an EGAI event, showing up as a near "triangular" shaped heat release rate where the EGAI heat release rate (HRR) is actually greater than the HRR from the primary propagating flame front from the cylinder combustion. The basic principle of the combustion is that the propagating flame creates a pressure wave that adiabatically compresses the end gas, which accelerates the low temperature chemical reactions to the point where the reactive radicals (e.g. $H_2O_2$) build and then collapse in an "OH Branching" episode which produces a high concentration of reactive radicals which then vigorously trigger the unburned fuel to combust.

On-Engine Experiments

Figure 5:
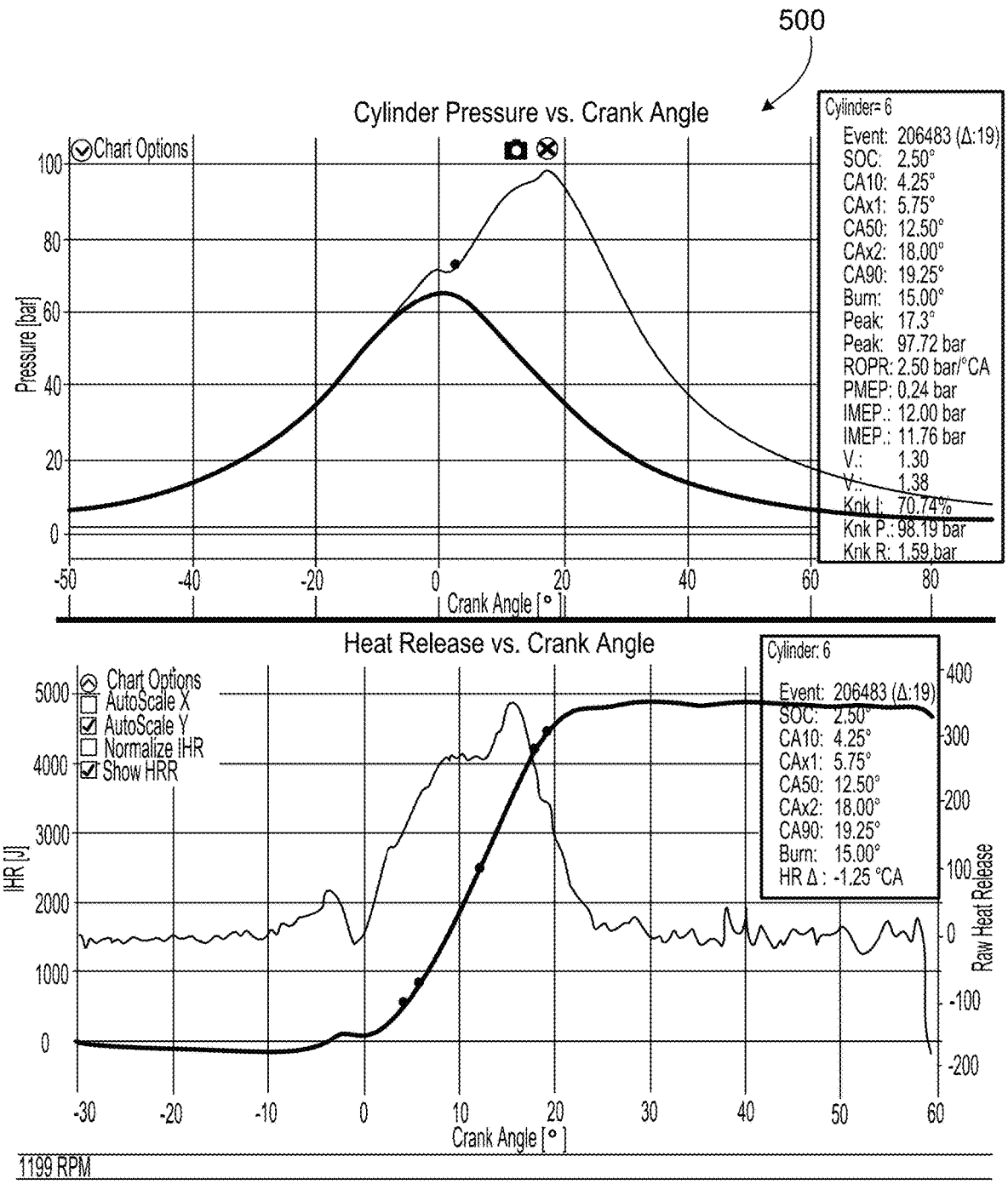
FIG. 5 are plots for example combustion cycles in an engine cylinder showing cylinder pressure versus crank angle, cylinder pressure versus cylinder volume, heat release versus crank angle, and cylinder pressure versus crank angle.

On-engine experiments confirm the viability of the control according to the concepts herein. FIG. 5 shows a first graph 500 of cylinder pressure vs. crank angle, and a second graph 520 of heat release vs. crank angle in the cylinder. What is shown is very similar to the theoretical analysis described earlier (e.g., in FIGS. 3 and 4), where instead of the bell type heat release rate (characterized by the second half of the burn being slower than the center of the burn), with EGAI, the second half of the burn is actually the fastest part of the burn. This means that the end gas is burning faster than the propagating flame. The result is a significantly shorter burn duration and fewer unburned hydrocarbons and less CO, but without increased NOx (which is driven by the burn rate in the first half). In some examples, a low cycle-to-cycle variation in heat release rates look similar over several sequential combustion phases, which makes it possible to monitor the heat release rate and correspondingly the heat release parameters and put them into a control loop for combustion control.

Controlling EGAI

Controlling EGAI is possible with combustion feedback. For example, an RT-CDC 211 (or ECU 102 with RT-CDC functionality) uses a specified parameter CAX2, where X2 is a specified value, to define a location of the inflection point in the heat release rate. For example, the X2 location can be calculated and/or experimentally determined based on the particular engine, operating parameters (e.g., fuel type, environment and/or other parameters), target engine performance and/or other factors. In some instances, CA80 is used, which reflects the crank angle at which 80% of the heat energy of combustion is released. Inspecting the graphs of FIG. 5, it is evident that this CA80 point is coincident with the EGAI heat release burst. RT-CDC can use spark timing to control the location of CAX2 to a specified value. CAX2 of about 18 degrees ATDC is a good example location for the EGAI burst. Coincidentally, CAX2 of 18 degrees also provides a good overall combustion phasing of about 12.5 degrees ATDC for CA50, which is a good operating point (optimal between CA50 of 8 degrees ATDC to 13 degrees ATDC), and a very short burn duration of CA90–CA10=Burn=15.0 degrees. The forward combustion phasing and the short burn duration contribute to good overall efficiency. Burning otherwise unburned hydrocarbons (UHC) also contributes to efficiency.

EGR Control of Burn Duration

In some instances, controlling EGAI can include controlling the EGR (e.g., rate, amount, temperature, and/or timing), in addition to or instead of controlling spark timing, to control the burn duration. In the present disclosure, a control loop can receive a target burn duration inputted into the RT-CDC, and the EGR rate or amount is adjusted to maintain the target burn duration. For example, if the burn duration is too long, then the EGR rate is reduced to speed up combustion, and if the burn duration is too short, then the EGR rate is increased to retard combustion.

In some implementations, an engine system can include an additional fuel supply, such as a hydrogen enrichment, diesel enrichment, gasoline enrichment, or propane enrichment, from an external source of the fuel. Since fuel has the opposite effect of exhaust gas when supplied to the cylinder, control of a hydrogen supply to the engine cylinder can affect burn duration, for example, such that if the burn rate is too slow (below a threshold set point), then an increase in the hydrogen enrichment can speed up the burn and decrease a burn duration. The reverse is also true, where a decrease in the hydrogen enrichment can slow down the burn and increase a burn duration of a combustion phase.

In some examples, a heat release (rate and total) is calculated by the RT-CDC, and the auto-ignition events are identified from the calculated heat release. Depending on a specified value for crank angle at a percentage heat release, burn duration, or other value, a control loop of the RT-CDC can adjust the engine parameters of an immediately subsequent or later combustion cycle to control EGAI (i.e., control the location and fraction of EGAI), and thereby adjust the heat release toward the specified value(s). For example, it can be determined that the identified one or more auto-ignition events begins later in the combustion cycle than a specified crank angle during the combustion phase, so the timing of the spark in the cylinder can be advanced in the combustion phase of the next cycle to shift auto-ignition events forward toward the specified crank angle. In another example, it can be determined that the identified one or more auto-ignition events begins earlier in the combustion cycle than a specified crank angle during the combustion phase, so the timing of the spark in the cylinder is retarded in the combustion phase of the next cycle to shift auto-ignition events backwards toward the specified crank angle. In certain examples, it can be determined that the identified one or more auto-ignition events include a burn duration of the combustion phase greater than a target burn duration, so an amount of exhaust gas supplied to the cylinder is decreased in the combustion phase of the next cycle to decrease burn duration in the next cycle toward the target burn duration. In another example, it can be determined that the identified one or more auto-ignition events include a burn duration of the combustion phase that is less than a target burn duration, so the amount of, temperature of, or both amount and temperature of exhaust gas supplied to the cylinder is increased in the combustion phase of the next cycle to increase burn duration in the next cycle toward the target burn duration. In some examples, adjusting a timing of a spark in the cylinder includes advancing the spark timing in the combustion phase of the next cycle to shift auto-ignition events forward with respect to a crank angle position, and/or adjusting an amount of, temperature of, or both amount of and temperature of exhaust gas supplied to the cylinder includes reducing the amount of exhaust gas supplied to the cylinder to shift auto-ignition events forward with respect to a crank angle position. In certain instances, it can be determined that the identified one or more auto-ignition events includes a burn duration of the combustion phase that is greater than a target burn duration, so an enrichment fuel (e.g., hydrogen, diesel, gasoline, propane, and/or other) is provided to the cylinder for the combustion phase of the next cycle to reduce the burn duration and approach the target burn duration in the combustion phase of the next cycle.

In some instances, the RT-CDC performs multi-parameter control, for example, where both ignition timing and thermo/chemical characteristics (e.g., EGR rate, EGR temp, hydrogen addition, intake manifold temperature, addition of another reactive fuel such as propane, or a combination of these) to achieve a target burn duration and to locate it such that the CAx % point (e.g. CA75) is at a target location. In some examples, if the burn duration is slower but it is desired to maintain the same CA75, then spark ignition should be advanced. In some implementations, it is desired to coordinate multi-parameter control using two actuator paths (e.g., ignition timing and thermo/chemical adjustment).

Figure 6:
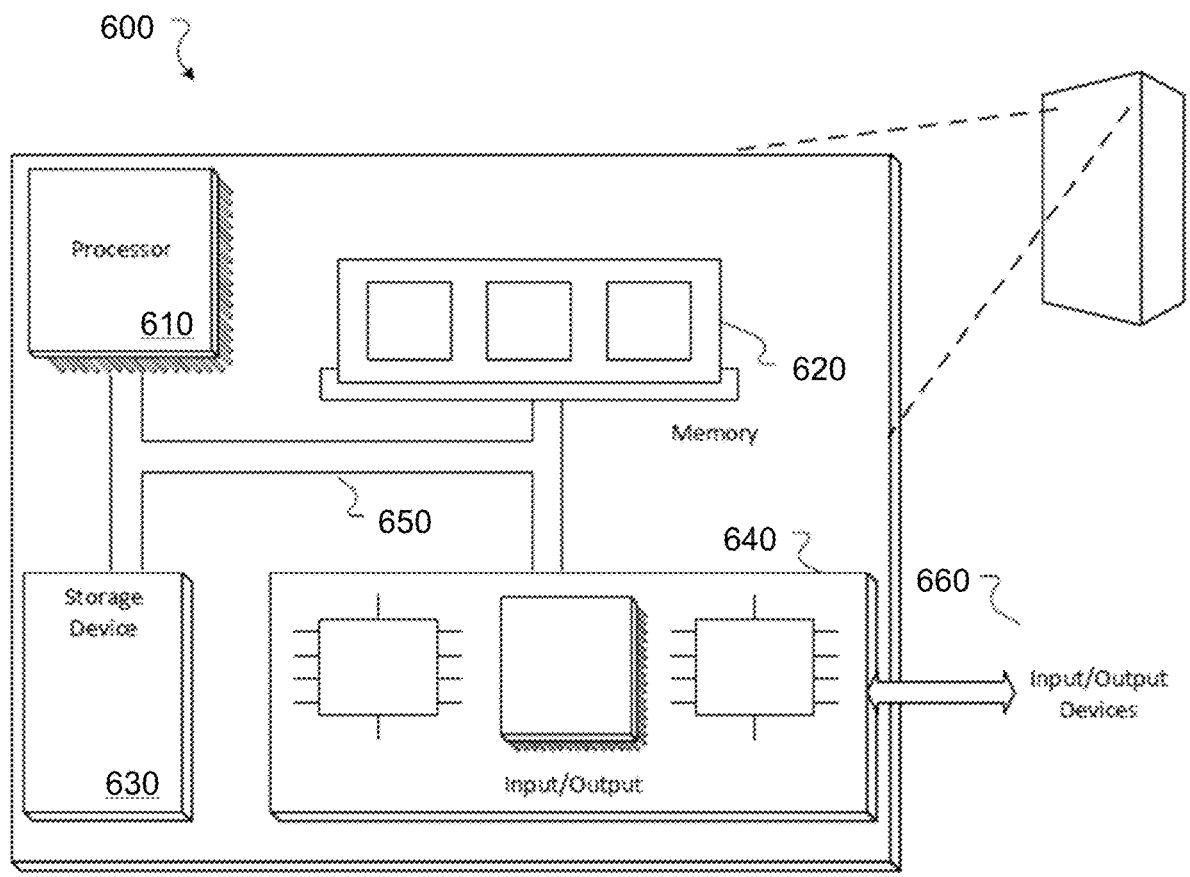
FIG. 6 is a block diagram of an example control system with a processor and memory.

FIG. 6 is a block diagram of an example controller 600. The example controller 600 can be used as the ECU 102 of FIG. 1 or engine control system 200 of FIG. 2. The control system 600 includes a processor 610, a memory 620, a storage device 630, and one or more input/output interface devices 640 (one shown). Each of the components 610, 620, 630, and 640 can be interconnected, for example, using a system bus 650.

The processor 610 is capable of processing instructions for execution within the controller 600. The term "execution" as used here refers to a technique in which program code causes a processor to carry out one or more processor instructions. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the controller 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the controller 600. In some implementations, the storage device 630 is a non-transitory computer-readable medium. In various different implementations, the storage device 630 can include, for example, a hard disk device, an optical disk device, a solid-state drive, a flash drive, magnetic tape, or some other large capacity storage device. In some examples, the storage device may store long-term data, such as data described in this application as stored on a storage device. The input/output interface devices 640 provide input/output operations for the controller 600. In some implementations, the input/output interface devices 640 can include one or more of a network interface devices, e.g., an Ethernet interface, a serial communication device, e.g., an RS-232 interface, and/or a wireless interface device, e.g., an 802.11 interface, a wireless modem, etc. The input/output interface devices 640 allow the controller 600 to communicate, for example, transmit and receive data such as engine sensor data using a data bus.

Program modules/software can be realized by instructions that, upon execution, cause one or more processing devices to carry out the processes and functions described above, for example, real-time calculation of heat transfer rate and total heat transfer of combustion cycles of an engine cylinder based on high-speed sampling of in-cylinder pressures, temperatures, and/or other measured parameters. Such instructions can include, for example, interpreted instructions such as script instructions, or executable code, or other instructions stored in a computer readable medium.

In some examples, the controller 600 is contained within a single integrated circuit package. A controller 600 of this kind, in which both a processor 610 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 640.

Although an example processing system has been described in FIG. 6, implementations of the subject matter and the functional operations described above can be implemented in other types of digital electronic circuitry, or in software, firmware, or hardware, including the structures disclosed in this specification and their structural equivalents, or in combinations of one or more of them. Implementations of the subject matter described in this specification, such as storing, maintaining, and displaying artifacts can be implemented as one or more programs, i.e., one or more modules of program instructions encoded on a tangible program carrier, for example a computer-readable medium, for execution by, or to control the operation of, a processing system. The computer readable medium can be a machine-readable storage device, a machine-readable storage substrate, a memory device, or a combination of one or more of them.

The term "controller" may encompass all apparatus, devices, and machines for processing data, including by way of example a programmable processor, a computer (e.g., an engine controller), or multiple processors or computers. A processing system can include, in addition to hardware, code that creates an execution environment for the program in question, e.g., code that constitutes processor firmware, a protocol stack, a database management system, an operating system, or a combination of one or more of them.

A program (also known as a software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer/controller or on multiple computers/controllers that are interconnected.

Computer readable media suitable for storing program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD- ROM, and Blu-Ray disks. The processor and the memory can be supplemented by, or incorporated in, special purpose logic circuitry.

Figure 7:
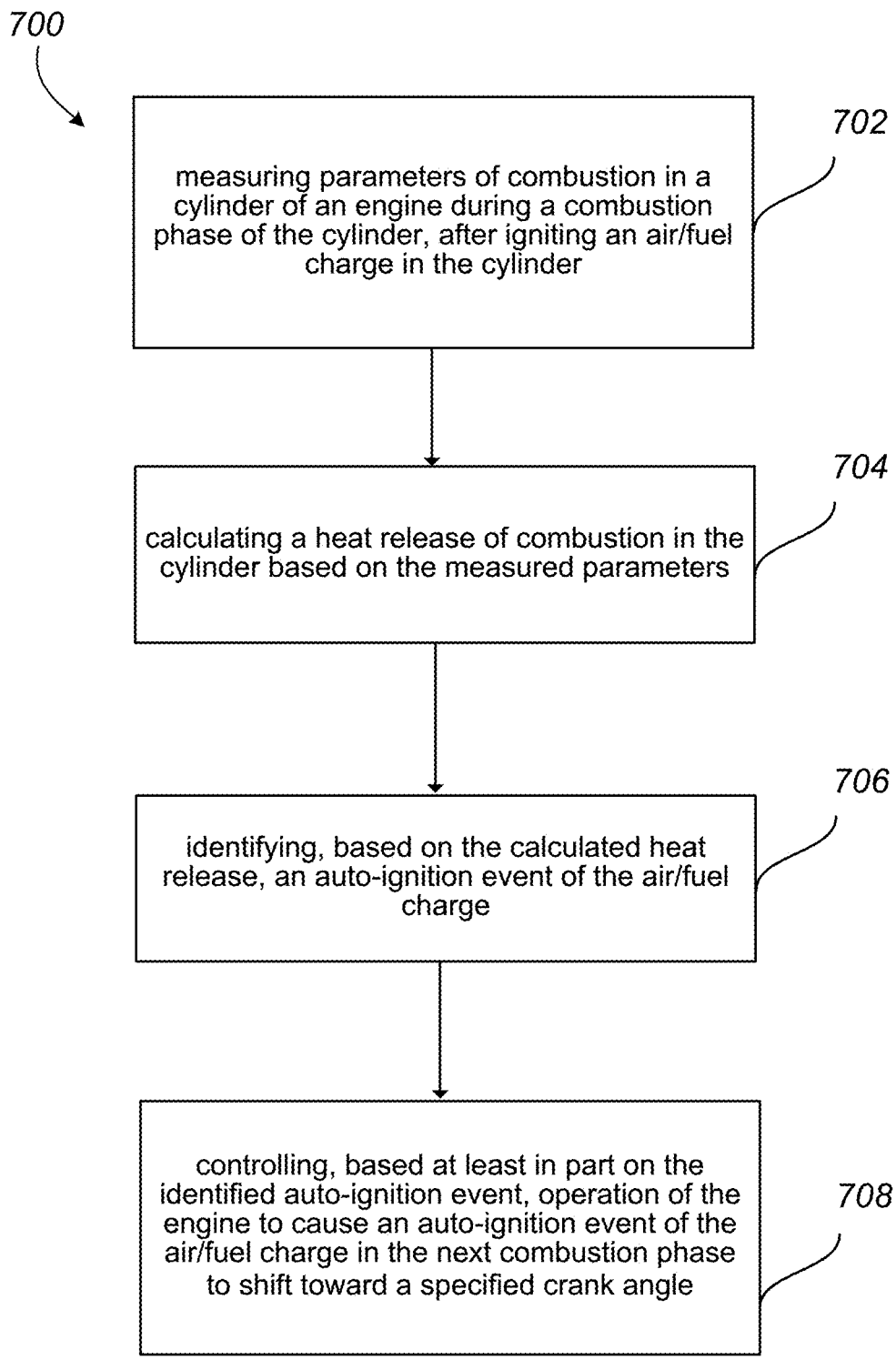
FIG. 7 is a flowchart describing an example method of controlling ignition in an internal combustion engine.

Acronyms/Abbreviations:
ATDC=after top dead center
BTDC=before top dead center
CA50=location of 50% mass fraction burn (crank angle degrees ATDC)
CAN=controller area network
COV=coefficient of variation
ECU=engine control unit
EGR=exhaust gas recirculation
EGRT=exhaust gas temperature (post EGR cooler)
EGAI=end gas auto-ignition
HCCI=homogeneous charge compression ignition
IMEP=indicated mean effective pressure (bar)
IVC=intake valve closing angle
LTC=low temperature combustion
MAP=manifold absolute pressure (bar)
MAT=manifold absolute temperature (K)
NOx=oxides of nitrogen
PCCI=premixed charge compression ignition
Ploc=location of peak pressure (crank angle degrees ATDC)
Pmax=maximum cylinder pressure (bar)
R&D=research and development
RCCI=reactivity controlled compression ignition
RPR=rate of pressure rise (bar/crank angle degree)
RT-CDC=real-time combustion diagnostics and control
SOC=start of combustion (crank angle degrees ATDC)
SI=spark ignition FIG. 7 is a flowchart describing an example method 700 of controlling ignition in an internal combustion engine, for example, performed by the engine control system 200 of FIG. 2 and controlling the example engine 101 of FIGS. 1 and 2. At 702, parameters of combustion in a cylinder of the engine are measured during a combustion phase of the cylinder after igniting an air/fuel charge in the cylinder. At 704, a heat release of combustion in the cylinder is calculated based on the measured parameters, for example, before a combustion phase of a next cycle. At 706, one or more auto-ignition events of the air/fuel charge are identified based on the calculated heat release. At 708, based at least in part on the identified one or more auto-ignition events, operation of the engine is controlled to cause an auto-ignition event of the air/fuel charge in the next combustion phase to shift toward a specified crank angle. In some instances, controlling operation of the engine includes controlling at least one of ignition timing in the cylinder for the next combustion phase of the cylinder or controlling a characteristic of exhaust gas supplied to the cylinder for the next combustion phase of the cylinder. The characteristic of exhaust gas can include an amount or a temperature of the exhaust gas. In some examples, controlling operation of the engine includes controlling at least one of ignition timing in the cylinder for the next combustion phase of the cylinder, an amount of exhaust gas supplied to the cylinder for the next combustion phase of the cylinder, a temperature of the exhaust gas supplied to the cylinder for the next combustion phase of the cylinder, an amount of an additional fuel provided to the air/fuel charge in the cylinder in the next combustion phase of the cylinder, or a temperature of an air/fuel intake manifold.

Figure 8:
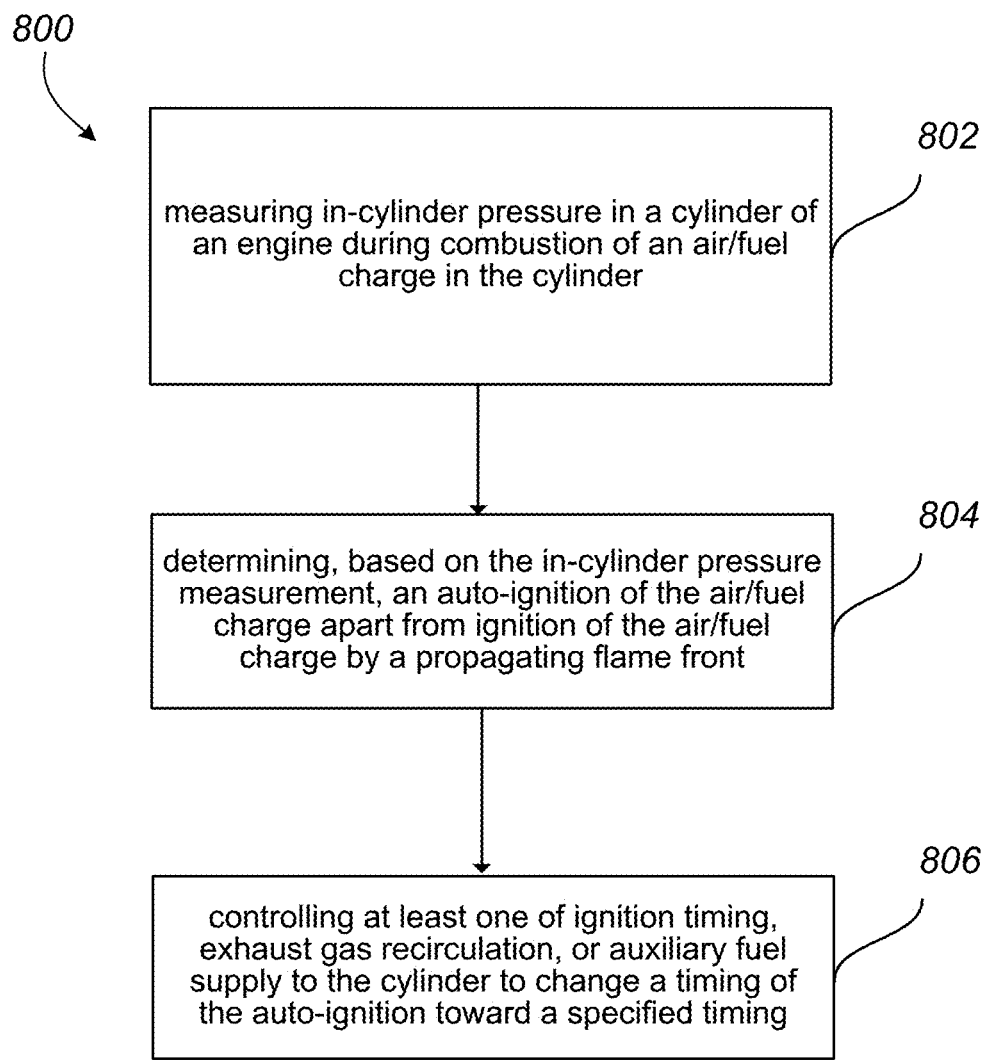
FIG. 8 is a flowchart describing an example method of controlling an engine.

FIG. 8 is a flowchart describing an example method 800 of controlling an engine, for example, performed by the engine control system 200 of FIG. 2 and controlling the example engine 101 of FIGS. 1 and 2. At 802, in-cylinder pressure in a cylinder of the engine is measured during combustion of an air/fuel charge in the cylinder. At 804, based on the in-cylinder pressure measurement, an auto-ignition of the air/fuel charge is determined apart from ignition of the air/fuel charge by a propagating flame front. At 806, at least one of ignition timing, exhaust gas recirculation, or auxiliary fuel supply to the cylinder is controlled to change a timing of the auto-ignition toward a specified timing.

In some instances, the method 700 or 800 can include controlling the EGR flow rate via an EGR valve or EGR suction device and valve, controlling EGR temperature via EGR cooler bypass, controlling intake manifold temperature (i.e., MAT) via charge air cooler bypass (e.g., intercooler), or a combination of these.

A number of embodiments have been described. Nevertheless, it will be understood that various modifications may be made. Accordingly, other embodiments are within the scope of the following claims.

What is claimed is:

1. A method of controlling combustion in an internal combustion engine, the method comprising:
measuring parameters of combustion in a cylinder of the engine during a combustion phase of the cylinder, after igniting an air/fuel charge in the cylinder;
calculating the heat release of combustion in the cylinder based on the measured parameters;
identifying, based on the calculated heat release, an auto-ignition event of the air/fuel charge; and
controlling, based at least in part on the identified auto-ignition event, operation of the engine to cause an auto-ignition event of the air/fuel charge in the next combustion phase to shift toward a specified crank angle.

2. The method of claim 1, wherein identifying the auto-ignition event comprises identifying an inflection point in the heat release that represents auto-ignition of a portion of the air/fuel charge.

3. The method of claim 1, wherein controlling operation of the engine comprises controlling at least one of ignition timing in the cylinder for the next combustion phase of the cylinder or controlling a characteristic of exhaust gas supplied to the cylinder for the next combustion phase of the cylinder.

4. The method of claim 3, comprising determining that the identified auto-ignition event occurs after a specified crank angle; and
wherein controlling the ignition timing in the cylinder comprises advancing the ignition timing in the next combustion phase of the cylinder to shift the auto-ignition event earlier toward the specified crank angle.

5. The method of claim 3, comprising determining that the identified auto-ignition event occurs earlier in the combustion phase than a specified crank angle; and
wherein controlling the ignition timing in the cylinder comprises retarding the ignition timing in the next combustion phase of the cylinder to shift the auto-ignition event later toward the specified crank angle.

6. The method of claim 3, wherein controlling a characteristic of exhaust gas supplied to the cylinder comprises controlling at least one of an amount of the exhaust gas or a temperature of the exhaust gas supplied to the cylinder.

7. The method of claim 6, comprising determining that the combustion in the cylinder has a burn duration greater than a specified burn duration; and
wherein controlling the amount of exhaust gas supplied to the cylinder comprises decreasing the amount of exhaust gas supplied to the cylinder in the next combustion phase of the cylinder to decrease burn duration toward the specified burn duration.

8. The method of claim 6, comprising determining that the combustion in the cylinder has a burn duration less than a specified burn duration; and
wherein controlling the amount of exhaust gas supplied to the cylinder comprises increasing the amount of exhaust gas supplied to the cylinder in the next combustion phase of the cylinder to increase burn duration toward the specified burn duration.

9. The method of claim 6, wherein controlling the temperature of the exhaust gas supplied to the cylinder comprises controlling the exhaust gas temperature with a cooler bypass.

10. The method of claim 1, comprising determining that the combustion in the cylinder has a burn duration greater than a specified burn duration; and
controlling operation of the engine comprises supplementing the air/fuel charge with an additional fuel or adjusting an amount of an additional fuel provided to the cylinder in the next combustion phase of the cylinder to decrease the burn duration toward the specified burn duration.

11. The method of claim 10, wherein the additional fuel comprises hydrogen, diesel, gasoline, or propane.

12. The method of claim 1, wherein controlling operation of the engine comprises controlling, based at least in part on at least one of the combustion in the cylinder or the identified auto-ignition event, a timing of a micro pilot fuel injection to the cylinder for the next combustion phase of the cylinder.

13. The method of claim 1, wherein calculating the heat release of combustion in the cylinder comprises calculating at least one of the heat release rate or heat release integral.

14. The method of claim 1, wherein measuring parameters of combustion comprises sampling an in-cylinder pressure sensor of the cylinder of the engine; and
wherein calculating the heat release of combustion comprises calculating the heat release rate of combustion in the cylinder based on the samples from the in-cylinder pressure sensor before the next combustion phase of the cylinder.

15. The method of claim 1, wherein controlling operation of the engine comprises controlling at least one of ignition timing in the cylinder for the next combustion phase of the cylinder, an amount of exhaust gas supplied to the cylinder for the next combustion phase of the cylinder, a temperature of the exhaust gas supplied to the cylinder for the next combustion phase of the cylinder, an amount of an additional fuel provided to the air/fuel charge in the cylinder in the next combustion phase of the cylinder, or a temperature of an air/fuel intake manifold.

16. The method of claim 15, wherein controlling a temperature of an air/fuel intake manifold comprises controlling the temperature of the air/fuel intake manifold with an intercooler.

17. An engine control system for controlling ignition in an internal combustion engine, the control system comprising:
a processor; and
non-transitory computer readable medium coupled to the processor and storing instructions operable to cause the processor to perform operations comprising:
(a) receive combustion parameters for a cylinder of the engine during a combustion phase of the cylinder, after igniting an air/fuel charge in the cylinder;
(b) determine the heat release of combustion in the cylinder based on the measured parameters;
(c) identify, based on the calculated heat release, an auto-ignition event of the air/fuel charge; and
(d) control, based at least in part on the identified auto-ignition event, operation of the engine to cause an auto-ignition event of the air/fuel charge in the next combustion phase to shift toward a specified crank angle.

18. The engine control system of claim 17, wherein the engine control system comprises a pressure sensor configured to measure pressure in the cylinder of the engine.

19. The engine control system of claim 18, wherein operation (a) comprises sampling the in-cylinder pressure sensor, and wherein operation (b) comprises calculating combustion metrics based on the output of the in-cylinder pressure sensor, the combustion metrics comprising the heat release rate of combustion in the cylinder.

20. The engine control system of claim 17, wherein operation (c) comprises identifying an inflection point in heat release that represents the ignition of the portion of the air/fuel charge that is not ignited by contact with a propagating flame front, and identifying a crank angle of a piston in the cylinder corresponding to the inflection point.

21. The engine control system of claim 17, wherein the control of the operation of the engine of operation (d) comprises controlling at least one of ignition timing in the cylinder for the next combustion phase of the cylinder or controlling a characteristic of exhaust gas supplied to the cylinder for the next combustion phase of the cylinder.

22. The engine control system of claim 21, wherein operation (d) comprises advancing the ignition timing when the auto-ignition event occurred after the specified crank angle and retarding the ignition timing when the auto-ignition event occurred before the specified crank angle.

23. The engine control system of claim 21, wherein operation (d) comprises controlling ignition timing by controlling the timing of a micro pilot fuel injection into the cylinder.

24. The engine control system of claim 21, wherein controlling a characteristic of exhaust gas supplied to the cylinder comprises controlling at least one of an amount of the exhaust gas or a temperature of the exhaust gas supplied to the cylinder.

25. The engine control system of claim 24, wherein controlling a temperature of the exhaust gas supplied to the cylinder comprises controlling the exhaust gas temperature with a cooler bypass.

26. The engine control system of claim 17, wherein the control of the operation of the engine of operation (d) comprises controlling at least one of ignition timing in the cylinder for the next combustion phase of the cylinder, an amount of exhaust gas supplied to the cylinder for the next combustion phase of the cylinder, a temperature of the exhaust gas supplied to the cylinder for the next combustion phase of the cylinder, an amount of an additional fuel provided to the air/fuel charge in the cylinder in the next combustion phase of the cylinder, or a temperature of an air/fuel intake manifold.

27. The engine control system of claim 26, wherein controlling a temperature of an air/fuel intake manifold comprises controlling the temperature of the air/fuel intake manifold with an intercooler.

28. The engine control system of claim 17, wherein the operations comprise:

(e) determining that the combustion in the cylinder comprises a burn duration of the combustion phase that is greater than a target burn duration; and
(f) controlling a supply of enrichment fuel to the cylinder for the next combustion phase of the cylinder based on the burn duration being greater than the target burn duration.

29. The engine control system of claim 28, wherein operation (f) comprises controlling a supply of hydrogen to the cylinder.

30. The engine control system of claim 17, wherein the operations comprise repeating operations (a)-(d) for each cylinder of the engine.

* * * * *